Aug. 30, 1932.  W. FERRIS  1,874,267
FEED MECHANISM FOR MILLING MACHINES
Filed July 30, 1927   3 Sheets-Sheet 1
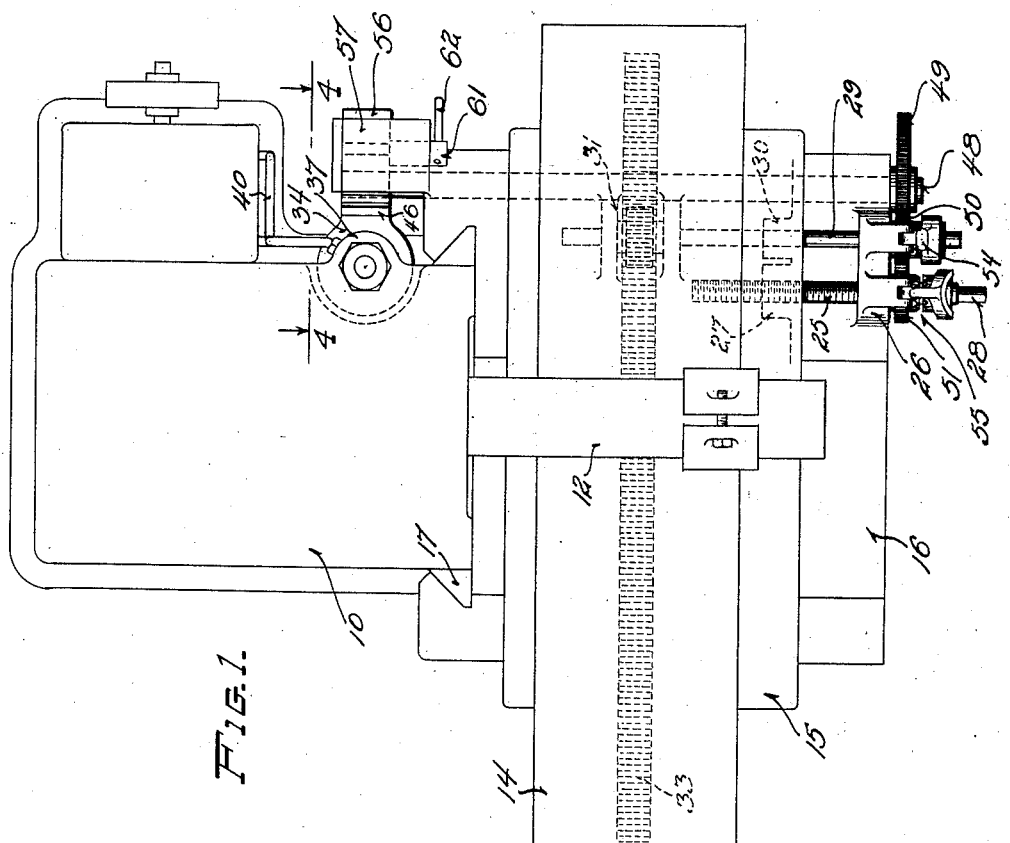
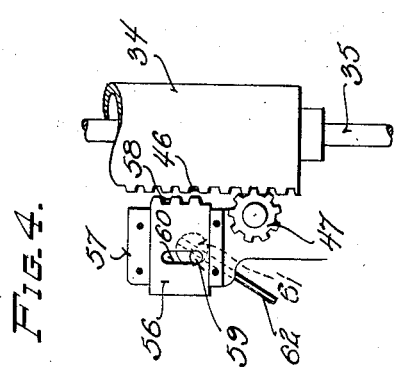
INVENTOR.
WALTER FERRIS.
BY
ATTORNEY.

Aug. 30, 1932.  W. FERRIS  1,874,267
FEED MECHANISM FOR MILLING MACHINES
Filed July 30, 1927   3 Sheets-Sheet 2

INVENTOR.
WALTER FERRIS
BY
ATTORNEY.

Aug. 30, 1932.  W. FERRIS  1,874,267
FEED MECHANISM FOR MILLING MACHINES
Filed July 30, 1927  3 Sheets-Sheet 3

INVENTOR.
WALTER FERRIS
BY
Ralph W. Brown.
ATTORNEY.

Patented Aug. 30, 1932

1,874,267

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

FEED MECHANISM FOR MILLING MACHINES

Application filed July 30, 1927. Serial No. 209,411.

This invention relates to feed mechanism primarily for milling machines although the novel features thereof may be applied to advantage in machine tools of other types.

One object of the present invention is the provision of mechanism selectively operable to effect any of a plurality of different feed motions from a single hydraulic motor.

Other more specific objects and advantages will appear from the following description of an illustrative embodiment of the present invention.

In the drawings:—

Figure 1 is a plan view of a milling machine equipped with a feed mechanism constructed in accordance with the present invention.

Fig. 4 is a detail view taken from the position indicated by line 4—4 of Figure 1.

Figure 2:
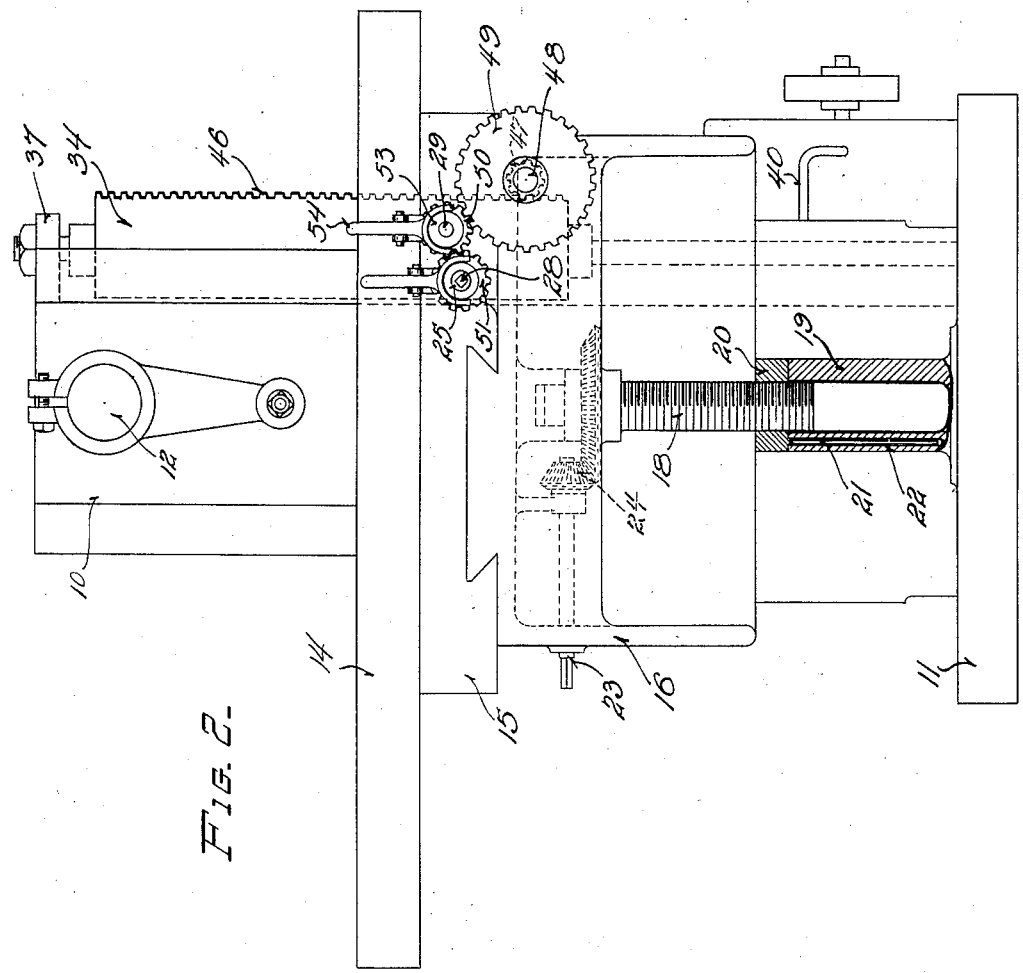
Fig. 2 is a front elevation.

The milling machine selected for purposes of illustration is of a well known type. It includes the usual column 10, rising from the base 11, and supporting the usual overarm 12 and cutter spindle 13. The spindle 13 is driven in the usual manner through mechanism housed within the column 10. The table, conventionally shown at 14, is mounted for lengthwise travel upon the usual saddle 15, which in turn is mounted for transverse travel upon the usual knee 16. The knee 16 is guided by vertical ways 17, formed in the usual manner upon the face of the column 10, and is supported upon a vertical screw 18, journalled in the knee and projecting loosely into a hollow post 19, rising from the base 11. A nut 20, resting upon the post 19 and threaded upon the screw 18, serves to normally support the screw. The nut is restrained against rotation by appropriate means such as a guide pin 21 depending therefrom and engaged within a bore 22 in the post. The screw is manually rotatable to raise and lower the knee, saddle and table by appropriate means such as a spindle 23 connected to the screw through gearing 24 carried by the knee. The saddle 15, and consequently the table, is shiftable transversely upon the knee through appropriate means such as a feed screw 25 rotatably anchored in a bracket 26 fixed to the knee and threaded through a boss 27 constituting an integral part of the saddle. The outer end 28 of the screw 25 is preferably squared or otherwise suitably fashioned to receive an appropriate crank by which the shaft may be manually rotated to adjust the saddle and table laterally. Lengthwise movement of the table is effected through a shaft 29 rotatably anchored in the bracket 26 and projected through a boss 30 and positioning lugs 31 carried by the saddle. The boss 30 and lugs 31 are free to travel lengthwise of the shaft 29 to accommodate the lateral movement of the saddle and table under the action of the screw 25. A pinion 32, splined on the shaft 29 and confined between the lugs 31, meshes with a rack 33 fixed to the bottom of the table and thus constitutes a driving connection between the shaft 29 and table. The mechanism hereinabove mentioned does not differ fundamentally from standard practice and further description thereof is deemed unnecessary for a complete understanding of the present invention.

In the machine shown a single motor cylinder is employed to effect a feed motion between the cutter and work in any of three directions. The motor cylinder shown comprises a cylinder 34 mounted for vertical reciprocation upon a guide rod 35 securely anchored in upright position beside the column 10 rearwardly of the knee 16. The lower end of the rod 35 is fixed in a lug 36 projecting laterally from the base 11 and the upper end is fixed in a lug 37 projecting laterally from the top of the column. A piston 38, fixed to the rod 35 intermediate the ends thereof, is closely fitted for relative travel within the cylinder. The upper end of the cylinder is connected to one side of a reversible flow variable displacement pump 39 of a well known type through pipe 40 and a passage 41 and port 42 formed in the upper end of the rod while the lower end of the cylinder is connected to the other side of the pump through pipe 43 and a passage 44 and port 45 formed in the lower end of the rod. The arrangement is such that when the pump delivers liquid through pipe 40 to the upper end of the cylinder, the cylinder rises at a rate corresponding to the rate of pump delivery, the liquid discharged from the lower end of the cylinder returning to the pump through pipe 43. Similarly when the pump delivers through pipe 43 the cylinder lowers and liquid discharged from the upper end thereof returns to the pump through pipe 40. The pump shown is fully described in my copending application, Serial No. 87,791, filed February 12, 1926.

A rack 46 fixed to the cylinder 34 meshes with a pinion 47 fixed to one end of a horizontal shaft 48 journaled in the knee 16, so shaft 48 normally rotates in response to vertical movement of the cylinder. The shaft 48 drives a gear 49 fixed to the other end thereof. Gear 49 meshes with a pinion 50 freely rotatable upon the shaft 29, and pinion 50 meshes with a second pinion 51 freely rotatable on the feed screw 25, so that both pinions rotate in response to rotation of the gear. Pinion 50 is connectible in driving relation with shaft 29 through an appropriate clutch 52, which in this instance includes a collar 53 splined on the shaft 29 and controlled by a hand lever 54. A similar clutch 55 is manually operable to make or break a driving connection between the pinion 51 and feed screw 25.

Figure 3:
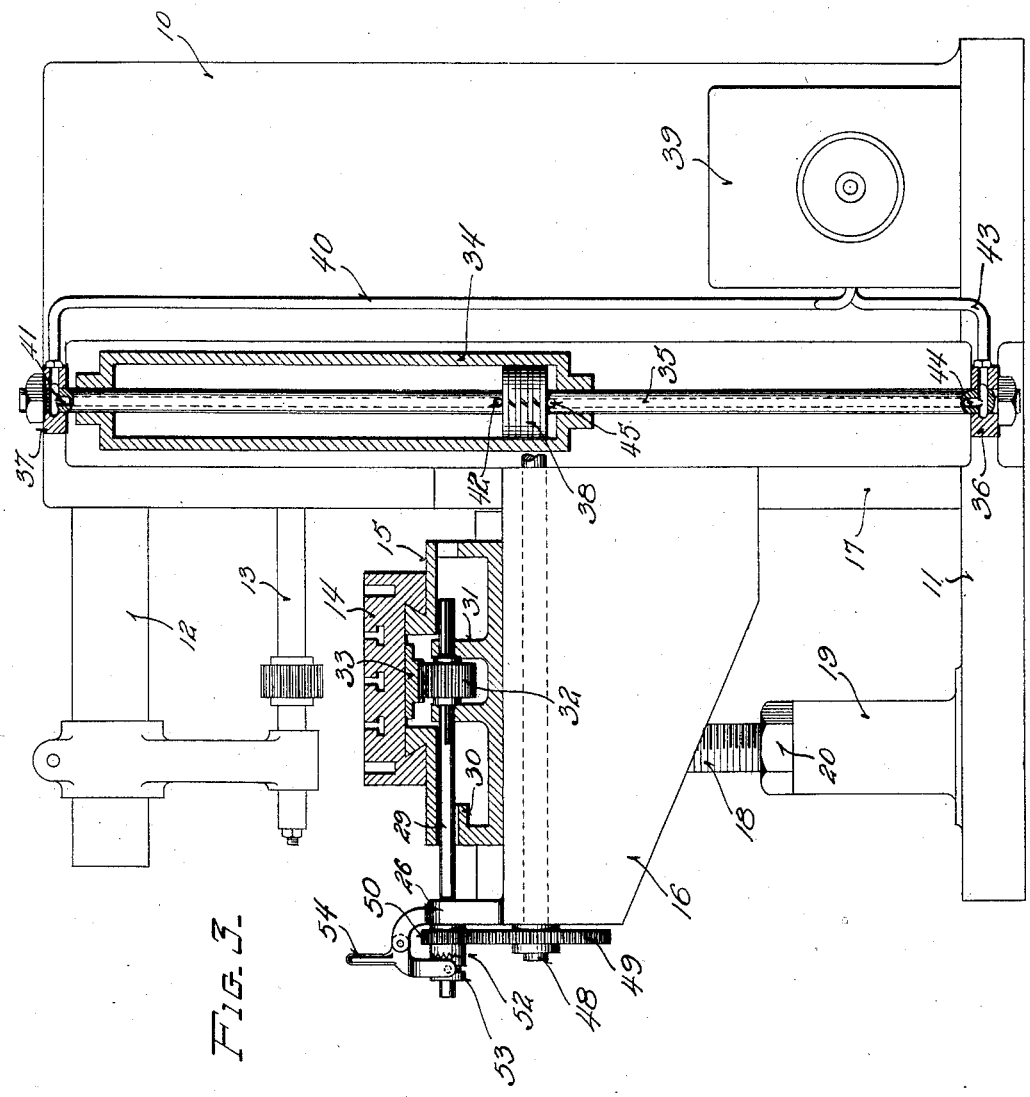
Fig. 3 is a side elevation partly in section.

The arrangement is such that when clutch 52 is closed and clutch 55 open, as indicated in Figures 1 and 3, upward travel of the cylinder 34 imparts a clockwise rotation (Fig. 2) to the shaft 48 and gear 49, so that the pinion 50, clutch 52, and shaft 29 are rotated counter-clockwise, and the table 14 travels toward the left. Similarly, downward movement of cylinder causes the table to travel toward the right. When the clutch 52 is open and clutch 55 closed the pinion 51, driven in one direction or the other from the cylinder 34 through gear 49 and pinion 50, imparts a corresponding rotation to the feed screw 25 to thereby feed the saddle 15 forwardly or rearwardly with a corresponding lateral movement of the table.

Provision is also made in the machine shown for effecting a vertical feed motion of the table under the direct action of the cylinder 34. To this end a locking element in the form of a block 56 is guided for lengthwise movement within a bracket 57 solidly anchored upon the knee 16 adjacent the cylinder 34. Teeth 58 formed upon the end of the block 56 are adapted to interlock with the teeth in the rack 46 when the block is advanced toward the cylinder. The block is actuated and controlled by appropriate means such as a pin 59, engaged within a slot 60 in the block and eccentrically mounted upon a cylindrical head 61 rotatably seated within the bracket 57. The head 61 carries a suitable handle 62 by which the same may be rotated to thereby advance and retract the block into and out of locking engagement with the rack. It will thus be noted that by advancing the locking element 56 into engagement with the rack 46 the knee 16 is rigidly connected to the cylinder 34 so as to move as a unit therewith. When so connected the knee, saddle, table and work carried thereby may be fed vertically toward and from the cutter under the direct action of the cylinder. When so operated the downward stroke of the knee is limited by the position of the nut 20 on the screw 18 which position may be varied by rotation of the screw in the manner hereinabove described.

Various changes may be made in the embodiment of the invention hereinabove specifically described without departing from or sacrificing any of the advantages of the invention as defined in the appended claims.

I claim:—

1. In a milling machine the combination of a knee mounted for vertical movement, a saddle mounted for transverse movement on said knee, a table mounted for lengthwise movement on said saddle, a vertically disposed piston and cylinder, a pump for operating the same, releasable connections between said knee and said piston and cylinder through which said knee, saddle and table are fed vertically by the action of said piston and cylinder, releasable connections between said saddle and said piston and cylinder through which said saddle and table are fed laterally by the action of said piston and cylinder, and releasable connections between said table and said piston and cylinder through which said table is fed longitudinally by the action of said piston and cylinder.

2. In a milling machine the combination of a knee mounted for vertical movement, a saddle mounted for transverse movement on said knee, a table mounted for lengthwise movement on said saddle, a piston and cylinder, mechanism actuated by said piston and cylinder and selectively operable upon said knee, saddle and table to feed said table vertically, transversely or longitudinally, and means for controlling said mechanism.

3. In a milling machine the combination of a knee mounted for vertical movement, a saddle mounted for transverse movement on said knee, a table mounted for lengthwise movement on said saddle, a hydraulic motor, a variable displacement pump for delivering a driving liquid to said motor to operate the same, mechanism driven by said motor and selectively operable upon said knee, saddle or table to feed said table vertically, transversely or longitudinally, and means for controlling said mechanism.

4. In a milling machine the combination of a work holder mounted for movement in a plurality of angularly related directions, a hydraulic motor, a variable displacement pump for driving said motor, mechanism driven by said motor and selectively operable to feed said work holder in any of said directions, and means for controlling said mechanism.

5. In a milling machine the combination of a work holder mounted for movement in a plurality of angularly related directions, coacting piston and cylinder elements, one of said elements being mounted for movement in one of said directions, releasable means for locking said holder to said movable element to move as a unit therewith, and mechanism driven by said movable element for moving said holder in another of said directions.

6. In a machine tool the combination of a support, coacting piston and cylinder elements, one of said elements being movable with respect to the other, releasable means for securing said movable element to said support to move said support in unison therewith, and mechanism driven by said movable element for moving said support in another direction.

7. In a milling machine the combination of a knee, saddle, and table, a vertical rack adjacent said knee, a co-acting piston and cylinder for operating said rack, a shaft journaled in said knee, a gear on said shaft meshing with said rack, mechanism driven by said shaft and selectively operable to drive said table longitudinally or transversely, and means for effecting vertical movement of said knee and in unison with said rack.

8. In a milling machine the combination of a knee, a table carried by said knee, a vertical rack adjacent said knee, a coacting piston and cylinder for operating said rack, a shaft journaled in said knee, a gear on said shaft meshing with said rack mechanism and driven by said shaft for driving said table, and means for effecting vertical movement of said knee and table in unison with said rack.

9. In a milling machine the combination of a knee, a table carried thereon, a vertical rack adjacent said knee, a coacting piston and cylinder for operating said rack, a shaft journaled in said knee, a gear on said shaft, mechanism driven by said shaft for driving said table, and a locking element carried by said knee and engageable with said rack to effect vertical movement of said knee and table in unison with said rack.

10. In a machine tool the combination of a movable carrier, coacting piston and cylinder elements, one of said elements being movable with respect to the other, means for connecting said carrier to said movable element to effect movement of said carrier therewith, and a second means actuated by said movable element for moving said carrier in a different direction.

11. In a machine tool the combination of a movable carrier, a fixed piston, a movable cylinder coacting with said piston, a rack on said cylinder, mechanism driven by said rack for moving said carrier in one direction, and a separate releasable connection between said rack and said carrier for moving the same in another direction in unison with said cylinder.

In witness whereof, I hereunto subscribe my name this 22d day of July, 1927.

WALTER FERRIS.